United States Patent
Schemp

(10) Patent No.: US 11,513,026 B1
(45) Date of Patent: Nov. 29, 2022

(54) WATER LEAK DETECTION ASSEMBLY

(71) Applicant: Brian Schemp, Gilbert, AZ (US)

(72) Inventor: Brian Schemp, Gilbert, AZ (US)

( * ) Notice: Subject to any disclaimer, the term of this patent is extended or adjusted under 35 U.S.C. 154(b) by 0 days.

(21) Appl. No.: 17/374,668

(22) Filed: Jul. 13, 2021

(51) Int. Cl.
   *G01M 3/28* (2006.01)
   *G08B 3/10* (2006.01)
   *G08B 21/18* (2006.01)
   *E03D 9/00* (2006.01)

(52) U.S. Cl.
   CPC ............ *G01M 3/2807* (2013.01); *E03D 9/00* (2013.01); *G08B 3/10* (2013.01); *G08B 21/18* (2013.01)

(58) Field of Classification Search
   CPC .......... G01M 3/2807; E03D 9/00; G08B 3/10; G08B 21/18
   See application file for complete search history.

(56) References Cited

U.S. PATENT DOCUMENTS

| | | | |
|---|---|---|---|
| 5,511,763 A * | 4/1996 | Green | ................... F16K 31/465 251/324 |
| 6,534,313 B1 | 3/2003 | Neff | |
| 6,671,893 B1 | 1/2004 | Quintana | |
| 6,802,084 B2 | 10/2004 | Ghertner | |
| 6,877,170 B1 * | 4/2005 | Quintana | ................... E03D 5/10 4/406 |
| 9,045,889 B2 | 6/2015 | Schuster | |
| 9,487,938 B2 | 11/2016 | Li | |
| 9,567,736 B1 | 2/2017 | Achterman | |
| 2005/0275546 A1 | 12/2005 | McKenna | |
| 2007/0125429 A1 | 6/2007 | Kandl | |
| 2015/0323412 A1 * | 11/2015 | Stoltz | ................... G01M 3/3254 700/282 |

FOREIGN PATENT DOCUMENTS

| | | |
|---|---|---|
| WO | WO 2006083501 | 8/2006 |
| WO | WO 2012116150 | 8/2012 |

* cited by examiner

*Primary Examiner* — Quan Zhen Wang
*Assistant Examiner* — Rajsheed O Black-Childress

(57) ABSTRACT

A water leak detection assembly for a toilet includes a housing and a flow sensor. The housing is mountable externally or internally to a tank of a toilet. The flow sensor is positionable in-line with a fill line that is engaged to the tank and detects a flow of water from the fill line into the tank. A microprocessor is engaged to and positioned in the housing and is operationally engaged to the flow sensor. The flow sensor is positioned to signal the microprocessor of the flow of water. Programming code positioned on the microprocessor enables the microprocessor to distinguish between signals from the flow sensor corresponding to a normal flow of water required for flushing the toilet and a leak of water from the tank into a bowl of the toilet. The microprocessor is positioned to selectively actuate an alert module to notify a user of the leak.

18 Claims, 7 Drawing Sheets

WATER LEAK DETECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to leak detection assemblies and more particularly pertains to a new leak detection assembly for a toilet. The present invention discloses a leak detection assembly comprising a flow sensor, which can be operationally engaged to a supply conduit, and an alert module that broadcasts an audible alert upon detection of a leak from a tank of a toilet.

(2) Description of Related Art Including Information Disclosed Under 37 CFR 1.97 and 1.98

The prior art relates to leak detection assemblies. Related prior art comprises device for preventing overflow of bowls of toilets, devices that determine leakage based on changes in fill times of a reservoir, by changes in fill level of a reservoir, and by detection of water flow within a supply conduit using multiple sensors. What is lacking in the prior art is a leak detection assembly comprising a flow sensor, which can be operationally engaged to a supply conduit, and an alert module that broadcasts an audible alert upon detection of a leak from a tank of a toilet.

BRIEF SUMMARY OF THE INVENTION

An embodiment of the disclosure meets the needs presented above by generally comprising a housing and a flow sensor. The housing defines an interior space and is configured to be mounted externally or internally to a tank of a toilet. The flow sensor is configured to be positioned in-line with a fill line that is engaged to the tank and to detect a flow of water from the fill line into the tank. A microprocessor is engaged to the housing, positioned in the interior space, and is operationally engaged to the flow sensor. The flow sensor is positioned to signal the microprocessor of the flow of water. An alert module is engaged to the housing and is operationally engaged to the microprocessor. Programming code positioned on the microprocessor enables the microprocessor to distinguish between signals from the flow sensor corresponding to a normal flow of water required for flushing the toilet and a leak of water from the tank into a bowl of the toilet. The microprocessor is positioned to selectively actuate the alert module to notify a user of the leak.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
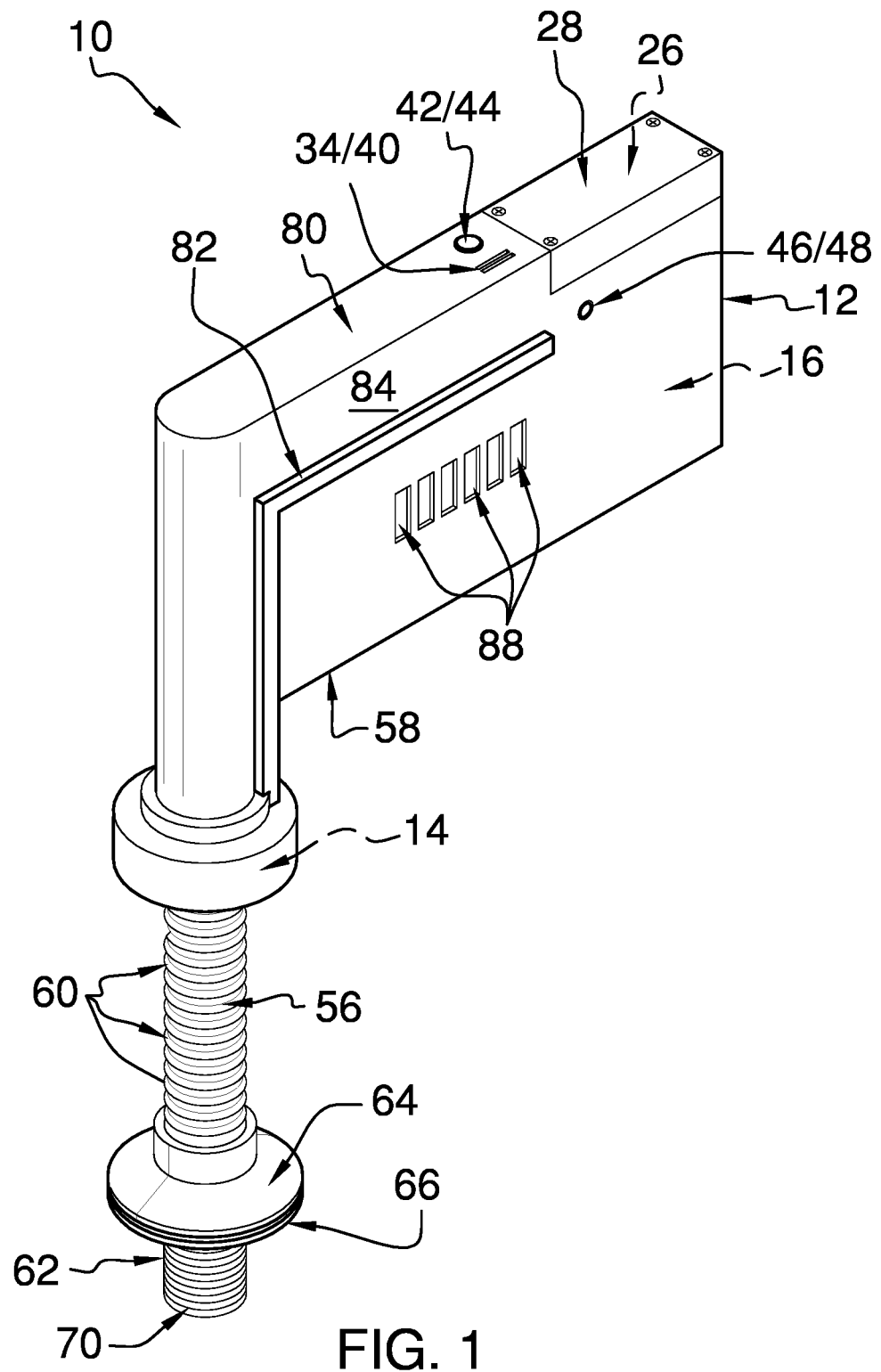
FIG. 1 is an isometric perspective view of a water leak detection assembly according to an embodiment of the disclosure.
Figure 2:
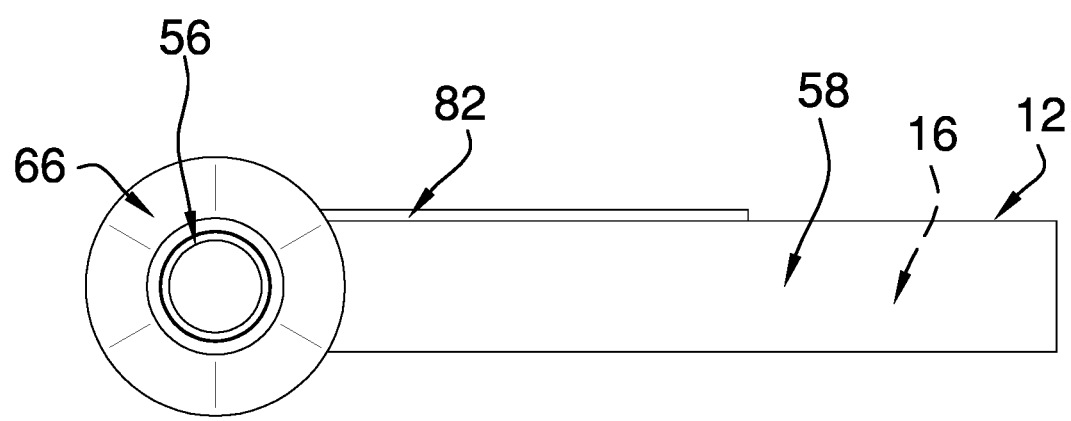
FIG. 2 is a bottom view of an embodiment of the disclosure.
Figure 3:
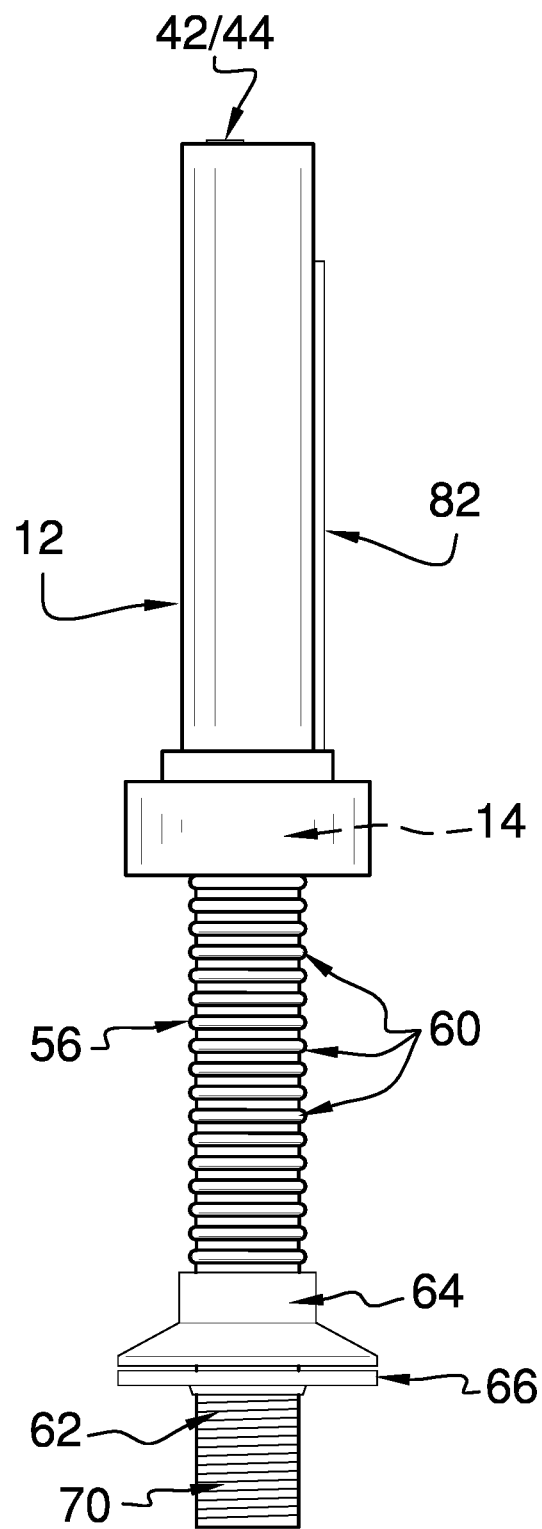
FIG. 3 is a side view of an embodiment of the disclosure.

With reference now to the drawings, and in particular to FIGS. 1 through 7 thereof, a new leak detection assembly embodying the principles and concepts of an embodiment of the disclosure and generally designated by the reference numeral 10 will be described.

As best illustrated in FIGS. 1 through 7, the water leak detection assembly 10 generally comprises a housing 12 and a flow sensor 14. The housing 12 defines an interior space 16 and is configured to be mounted externally or internally to a tank 18 of a toilet 20. A microprocessor 22 and a battery 24 are engaged to the housing 12 and are positioned in the interior space 16. The battery 24 is operationally engaged to the microprocessor 22. A cutout 26 is positioned in an upper facet 80 of the housing 12 and opens into the interior space 16 so that the battery 24 is accessible through the cutout 26. A panel 28 is selectively sealably engageable to the housing 12 to close the cutout 26.

Figure 6:
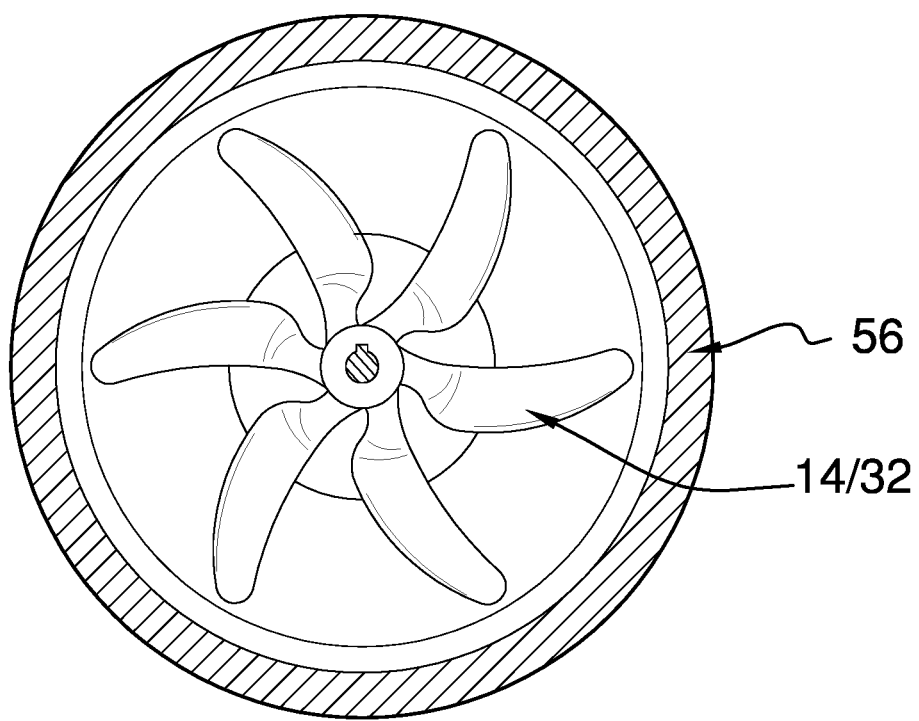
FIG. 6 is a cross-sectional view of an embodiment of the disclosure.
Figure 7:
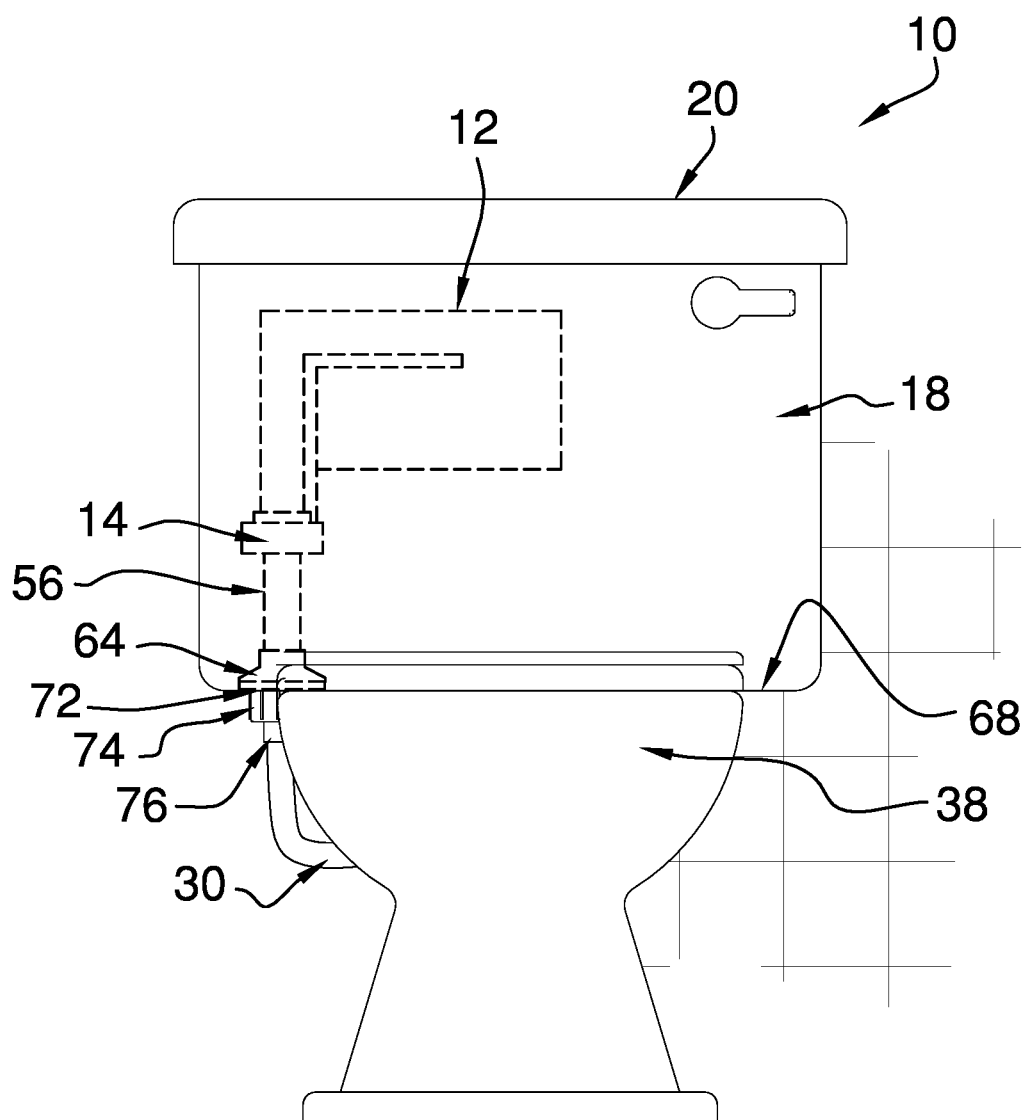
FIG. 7 is an in-use view of an embodiment of the disclosure.

The flow sensor 14 is configured to be positioned in-line with a fill line 30 that is engaged to the tank 18 and to detect a flow of water from the fill line 30 into the tank 18. The flow sensor 14 is operationally engaged to the flow sensor 14 and thus is positioned to signal the microprocessor 22 of the flow of water. The flow sensor 14 may comprise a turbine flow meter 32, as shown in FIG. 6, or other flow sensing means, such as, but not limited to, a thermal mass flow meter, a pressure based flow meter, and the like.

Figure 4:
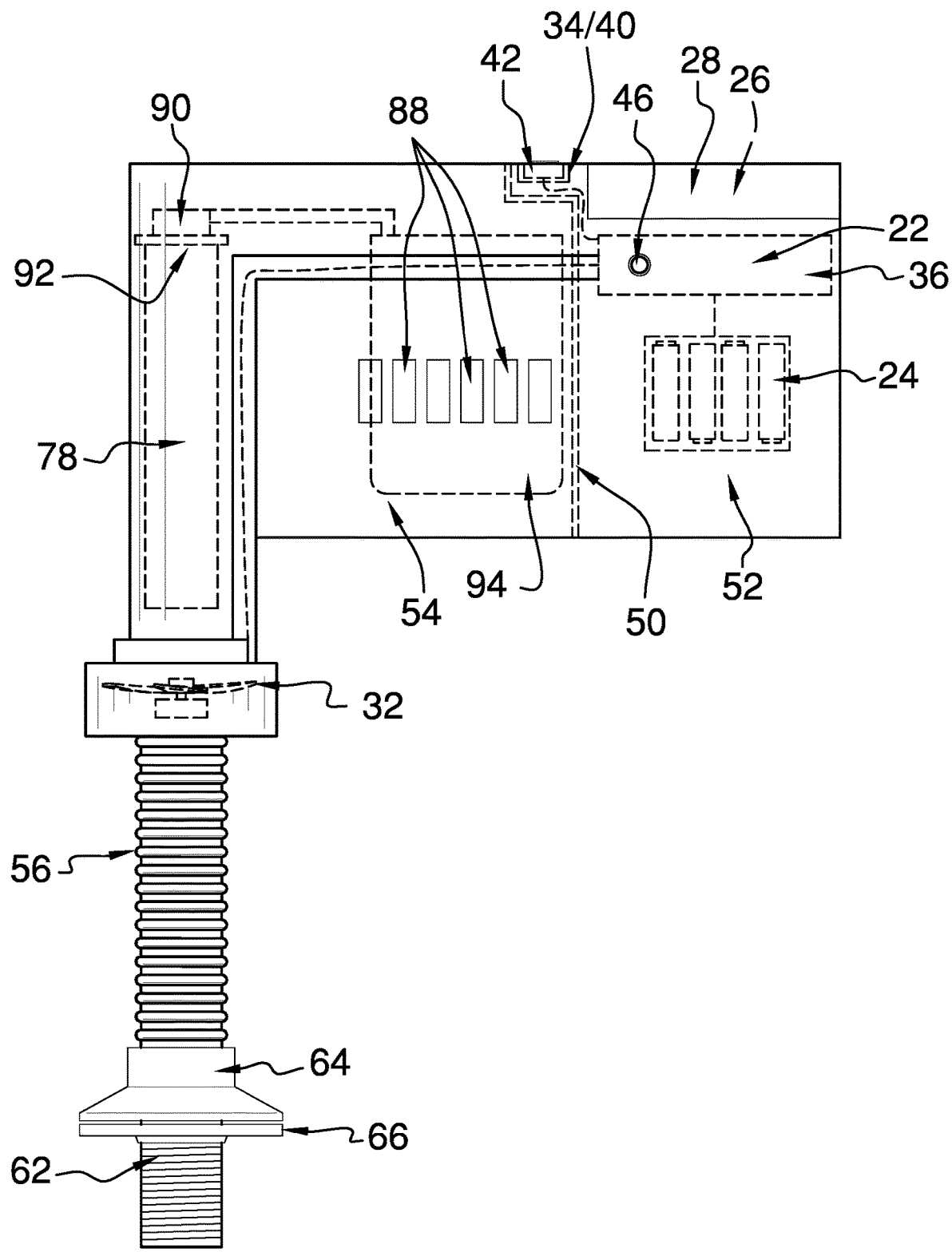
FIG. 4 is a front view of an embodiment of the disclosure.
Figure 5:
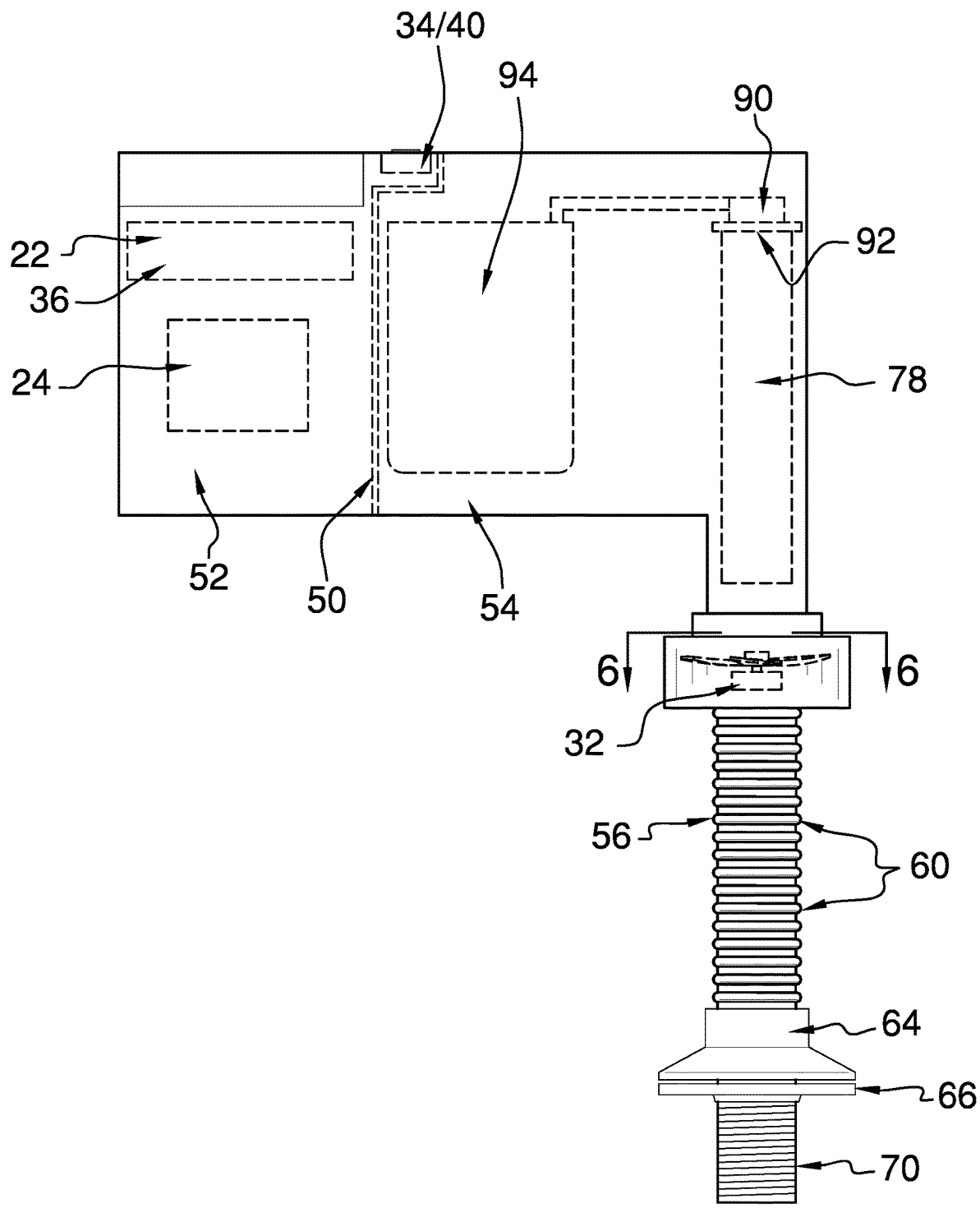
FIG. 5 is a rear view of an embodiment of the disclosure.

An alert module 34 is engaged to the housing 12 and is operationally engaged to the microprocessor 22. Programming code 36 positioned on the microprocessor 22 enables the microprocessor 22 to distinguish between signals from the flow sensor 14 corresponding to a normal flow of water required for flushing the toilet 20 and a leak of water from the tank 18 into a bowl 38 of the toilet 20. The microprocessor 22 is positioned to selectively actuate the alert module 34 to notify a user of the leak. The alert module 34 may comprise a speaker 40, as shown in FIG. 4, which is configured to broadcast an audio alert. The alert module 34 also may comprise other alerting means, such as, but not limited to, bulbs providing visual alerts, transmitters transmitting alerts to electronic devices of users, and the like.

A bypass switch 42 is engaged to the housing 12 and is operationally engaged to the microprocessor 22. The bypass switch 42 is configured to be switched to signal the microprocessor 22 to temporarily ignore a signal from the flow sensor 14. As time usually is required to arrange for and to repair a leak, the bypass switch 42 allows a user to arrange for repair of the leak without being further notified. For example, the microprocessor 22 may be programmed to allow a set number of actuations of the bypass switch 42, perhaps three actuations, and then not permit further actuations and resume notifications to the user. The bypass switch 42 may comprise a depressible deactivation button 44, as shown in FIG. 1, or other switching means, such as, but not limited to, slide switches, toggle switches, and the like.

A reset switch 46 is engaged to the housing 12 and is operationally engaged to the microprocessor 22. The reset switch 46 is configured to be switched, after fixing of the leak, to signal the microprocessor 22 to again process the signal from the flow sensor 14. The reset switch 46 may comprise a depressible reset button 48, as shown in FIG. 1, or other switching means, such as, but not limited to, slide switches, toggle switches, and the like.

In one configuration of the water leak detection assembly 10, a wall 50 is engaged to the housing 12 and positioned in the interior space 16 to define a first compartment 52 and a second compartment 54. The microprocessor 22 and the battery 24 are positioned in the first compartment 52.

A pipe 56 is engaged to and extends from a lower facet 58 of the housing 12 so that the pipe 56 is in fluidic communication with the second compartment 54. The pipe 56 is configured to operationally engage the fill line 30 and the tank 18 so that the pipe 56 is in fluidic communication with the fill line 30 and so that the housing 12 is mounted to and positioned within the tank 18. The pipe 56 may comprise a plurality of pleated sections 60 so that the pipe 56 is selectively length adjustable.

A segment 62 of the pipe 56 distal from the housing 12 is threaded. A first nut 64 is threadedly engaged to the segment 62. A gasket 66 is positioned on the segment 62 so that the gasket 66 is positioned between the first nut 64 and a bottom 68 of the tank 18. A portion 70 of the segment 62 of the pipe 56 that protrudes through an aperture 72 in the bottom 68 of the tank 18 is configured to engage a second nut 74 to mount the pipe 56 and the housing 12 to the tank 18. The gasket 66 is configured to seal the pipe 56 within the aperture 72. The portion 70 of the segment 62 also is configured to threadedly engage a coupler 76 that is engaged to the fill line 30 to operationally engage the pipe 56 to the file line.

A tube 78 is engaged to the housing 12 and extends from the pipe 56 to proximate to the upper facet 80 of the housing 12 within the second compartment 54. Water from the feed line flows through the pipe 56 and the tube 78 into the second compartment 54. The flow sensor 14 is positioned in one of the pipe 56 and the tube 78. As shown in FIG. 4, the flow sensor 14 is positioned in the pipe 56 proximate to the lower facet 58 of the housing 12.

A chase 82 is engaged to an outer surface 84 of the housing 12 and extends from proximate to the flow sensor 14 to proximate to the microprocessor 22. A wire 86 extends through the chase 82 and is operationally engaged to the microprocessor 22 and the flow sensor 14.

A set of orifices 88 is positioned in the housing 12 and opens into the second compartment 54. The orifices 88 are configured to allow flow of water from the second compartment 54 into the tank 18. A valve 90 is operationally engaged to an upper end 92 of the tube 78 and is positioned to selectively close the tube 78. A float 94 is operationally engaged to the valve 90 and is configured to float when a water level in the tank 18 reaches the set of orifices 88, positioning the float 94 to actuate the valve 90 to stop the flow of water from the fill line 30 to the tank 18.

In use, the pipe 56 is engaged to the fill line 30 and the tank 18 so that the pipe 56 is in fluidic communication with the fill line 30 and the housing 12 is mounted to and positioned within the tank 18. During normal flushing of the toilet 20, the microprocessor 22 receives a signal from the flow sensor 14 but does not actuate the alert module 34. However, should a leak develop between the tank 18 and the bowl 38, the programming code 36 on the microprocessor 22 enables it to differentiate the corresponding signal coming from the flow sensor 14 and to actuate the alert module 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A water leak detection assembly comprising:
   a housing defining an interior space, the housing being configured for mounting externally or internally to a tank of a toilet;
   a microprocessor engaged to the housing and positioned in the interior space;
   a flow sensor configured for positioning in-line with a fill line engaged to the tank, the flow sensor being opera- tionally engaged to the microprocessor, wherein the flow sensor is configured for detecting a flow of water from the fill line into the tank, positioning the flow sensor for signaling the microprocessor of the flow of water;

an alert module engaged to the housing and being operationally engaged to the microprocessor;

programming code positioned on the microprocessor enabling the microprocessor for distinguishing between signals from the flow sensor corresponding to a normal flow of water required for flushing the toilet and a leak of water from the tank into a bowl of the toilet, positioning the microprocessor for selectively actuating the alert module for notifying a user of the leak;

a wall engaged to the housing and positioned in the interior space defining a first compartment and a second compartment, the microprocessor and a battery being positioned in the first compartment, the battery being operationally engaged to the microprocessor;

a pipe engaged to and extending from a lower facet of the housing, such that the pipe is in fluidic, communication with the second compartment, the pipe being configured for operationally engaging the fill line and the tank, such that pipe is in fluidic communication with the fill line and the housing is mounted to and positioned within the tank;

a tube engaged to the housing and extending from the pipe to proximate to the upper facet of the housing within the second compartment, such that water from the feed line flows through the pipe and the tube into the second compartment, the flow sensor being positioned in one of the pipe and the tube;

a set of orifices positioned in the housing and opening into the second compartment, wherein the orifices are configured for flowing of water from the second compartment into the tank;

a valve operationally engaged to an upper end of the tube, such that the valve is positioned for selectively closing the tube; and a float operationally engaged to the valve, wherein the float is configured for floating when a water level in the tank reaches the set of orifices, positioning the float for actuating the valve for stopping the flow of water from the fill line to the tank.

2. The water leak detection assembly of claim 1, wherein the flow sensor comprises a turbine flow meter.

3. The water leak detection assembly of claim 1, wherein the alert module comprises a speaker configured for broadcasting an audio alert.

4. The water leak detection assembly of claim 1, further including a bypass switch engaged to the housing and being operationally engaged to the microprocessor, wherein the bypass switch is configured for being switched for signaling the microprocessor for temporarily ignoring a signal from the flow sensor.

5. The water leak detection assembly of claim 4, wherein the bypass switch comprises a depressible deactivation button.

6. The water leak detection assembly of claim 1, further including a reset switch engaged to the housing and being operationally engaged to the microprocessor, wherein the reset switch is configured for being switched, after fixing of the leak, for signaling the microprocessor for processing the signal from the flow sensor.

7. The water leak detection assembly of claim 6, wherein the reset switch comprises a depressible reset button.

8. The water leak detection assembly of claim 1, further including:
a battery engaged to the housing and positioned in the interior space, the battery being operationally engaged to the microprocessor;
a cutout positioned in an upper facet of the housing and opening into the interior space, such that the battery is accessible through the cutout; and
a panel selectively sealably engageable to the housing for closing the cutout.

9. The water leak detection assembly of claim 1, wherein the pipe comprises a plurality of pleated sections, such that the pipe is selectively length adjustable.

10. The water leak detection assembly of claim 1, further including:
a segment of the pipe distal from the housing being threaded;
a first nut threadedly engaged to the segment; and
a gasket positioned on the segment, such that the gasket is positioned between the first nut and a bottom of the tank, wherein a portion of the segment of the pipe protruding through an aperture in the bottom of the tank is configured for engaging a second nut for mounting the pipe and the housing to the tank, wherein the gasket is configured for sealing the pipe within the aperture, and wherein the portion of the segment also is configured for threadedly engaging a coupler engaged to the fill line for operationally engaging the pipe to the file line.

11. The water leak detection assembly of claim 10, wherein the flow sensor is positioned in the pipe proximate to the lower facet of the housing.

12. The water leak detection assembly of claim 1, further including:
a chase engaged to an outer surface of the housing and extending from proximate to the flow sensor to proximate to the microprocessor; and
a wire extending through the chase and being operationally engaged to the microprocessor and the flow sensor.

13. A water leak detection system comprising:
a toilet comprising a tank and a bowl;
a feed line operationally engaged to the tank;
a housing defining an interior space, the housing being mounted externally or internally to the tank;
a microprocessor engaged to the housing and positioned in the interior space;
a flow sensor positioned in-line with the fill line, the flow sensor being operationally engaged to the microprocessor, wherein the flow sensor is configured for detecting a flow of water from the fill line into the tank, positioning the flow sensor for signaling the microprocessor of the flow of water;
an alert module engaged to the housing and being operationally engaged to the microprocessor;
programming code positioned on the microprocessor enabling the microprocessor for distinguishing between signals from the flow sensor corresponding to a normal flow of water required for flushing the toilet and a leak of water from the tank into the bowl, positioning the microprocessor for selectively actuating the alert module for notifying a user of the leak;
a wall engaged to the housing and positioned in the interior space defining a first compartment and a second compartment, the microprocessor and a battery being positioned in the first compartment, the battery being operationally engaged to the microprocessor;

a pipe engaged to and extending from a lower facet of the housing, such that the pipe is in fluidic communication with the second compartment, the pipe being operationally engaging the fill line and the tank, such that pipe is in fluidic communication with the fill line and the housing is mounted to and positioned within the tank;

a tube engaged to the housing and extending from the pipe to proximate to the upper facet of the housing within the second compartment, such that water from the feed line flows through the pipe and the tube into the second compartment, the flow sensor being positioned in one of the pipe and the tube;

a set of orifices positioned in the housing and opening into the second compartment, wherein the orifices are configured for flowing of water from the second compartment into the tank;

a valve operationally engaged to an upper end of the tube, such that the valve is positioned for selectively closing the tube; and a float operationally engaged to the valve, wherein the float is configured for floating when a water level in the tank reaches the set of orifices, positioning the float for actuating the valve for stopping the flow of water from the fill line to the tank.

14. The water leak detection system of claim 13, wherein:
the flow sensor comprises a turbine flow meter; and
the alert module comprises a speaker configured for broadcasting an audio alert.

15. The water leak detection system of claim 13, further including:
a bypass switch engaged to the housing and being operationally engaged to the microprocessor, wherein the bypass switch is configured for being switched for signaling the microprocessor for temporarily ignoring a signal from the flow sensor; and
a reset switch engaged to the housing and being operationally engaged to the microprocessor, wherein the reset switch is configured for being switched, after fixing of the leak, for signaling the microprocessor for processing the signal from the flow sensor.

16. The water leak detection system of claim 15, wherein:
the bypass switch comprises a depressible deactivation button; and
the reset switch comprises a depressible reset button.

17. The water leak detection system of claim 13, further including:
the flow sensor being positioned in the pipe proximate to the lower facet of the housing;
a chase engaged to an outer surface of the housing and extending from proximate to the flow sensor to proximate to the microprocessor; and
a wire extending through the chase and being operationally engaged to the microprocessor and the flow sensor.

18. A water leak detection assembly comprising:
a housing defining an interior space, the housing being configured for mounting externally or internally to a tank of a toilet;
a microprocessor engaged to the housing and positioned in the interior space,
a flow sensor configured for positioning in-line with a fill line engaged to the tank, the flow sensor being operationally engaged to the microprocessor, wherein the flow sensor is configured for detecting a flow of water from the fill line into the tank, positioning the flow sensor for signaling the microprocessor of the flow of water, the flow sensor comprising a turbine flow meter;

an alert module engaged to the housing and being operationally engaged to the microprocessor, the alert module comprising a speaker configured for broadcasting an audio alert;

programming code positioned on the microprocessor enabling the microprocessor for distinguishing between signals from the flow sensor corresponding to a normal flow of water required for flushing the toilet and a leak of water from the tank into a bowl of the toilet, positioning the microprocessor for selectively actuating the alert module for notifying a user of the leak;

a bypass switch engaged to the housing and being operationally engaged to the microprocessor, wherein the bypass switch is configured for being switched for signaling the microprocessor for temporarily ignoring a signal from the flow sensor, the bypass switch comprising a depressible deactivation button;

a reset switch engaged to the housing and being operationally engaged to the microprocessor, wherein the reset switch is configured for being switched, after fixing of the leak, for signaling the microprocessor for processing the signal from the flow sensor, the reset switch comprising a depressible reset button;

a battery engaged to the housing and positioned in the interior space, the battery being operationally engaged to the microprocessor;

a cutout positioned in an upper facet of the housing and opening into the interior space, such that the battery is accessible through the cutout;

a panel selectively sealably engageable to the housing for closing the cutout;

a wall engaged to the housing and positioned in the interior space defining a first compartment and a second compartment, the microprocessor and the battery being positioned in the first compartment;

a pipe engaged to and extending from a lower facet of the housing, such that the pipe is in fluidic, communication with the second compartment, the pipe being configured for operationally engaging the fill line and the tank, such that pipe is in fluidic communication with the fill line and the housing is mounted to and positioned within the tank, the pipe comprising a plurality of pleated sections, such that the pipe is selectively length adjustable, a segment of the pipe distal from the housing being threaded;

a first nut threadedly engaged to the segment;

a gasket positioned on the segment, such that the gasket is positioned between the first nut and a bottom of the tank, wherein a portion of the segment of the pipe protruding through an aperture in the bottom of the tank is configured for engaging a second nut for mounting the pipe and the housing to the tank, wherein the gasket is configured for sealing the pipe within the aperture, and wherein the portion of the segment also is configured for threadedly engaging a coupler engaged to the fill line for operationally engaging the pipe to the file line;

a tube engaged to the housing and extending from the pipe to proximate to the upper facet of the housing within the second compartment, such that water from the feed line flows through the pipe and the tube into the second compartment, the flow sensor being positioned in one of the pipe and the tube, the flow sensor being positioned in the pipe proximate to the lower facet of the housing;

a chase engaged to an outer surface of the housing and extending from proximate to the flow sensor to proximate to the microprocessor;

a wire extending through the chase and being operationally engaged to the microprocessor and the flow sensor;

a set of orifices positioned in the housing and opening into the second compartment, wherein the orifices are configured for flowing of water from the second compartment into the tank;

a valve operationally engaged to an upper end of the tube, such that the valve is positioned for selectively closing the tube; and a float operationally engaged to the valve, wherein the float is configured for floating when a water level in the tank reaches the set of orifices, positioning the float for actuating the valve for stopping the flow of water from the fill line to the tank.

* * * * *